United States Patent [19]

Spofford

[11] 4,148,220
[45] Apr. 10, 1979

[54] LINEARIZATION MEANS AND METHOD FOR A THERMISTOR TEMPERATURE SENSING SYSTEM

[75] Inventor: Walter R. Spofford, Bedford, Mass.

[73] Assignee: P. R. Mallory & Co. Inc., Indianapolis, Ind.

[21] Appl. No.: 841,524

[22] Filed: Oct. 12, 1977

[51] Int. Cl.² .............................................. G01K 7/24
[52] U.S. Cl. ............................................... 73/362 AR
[58] Field of Search ................... 73/362 AR; 307/310; 340/228 R

[56] References Cited

U.S. PATENT DOCUMENTS

| | | | |
|---|---|---|---|
| 3,973,147 | 8/1976 | Yu | 73/362 AR X |
| 4,023,094 | 5/1977 | Adams | 73/362 AR X |
| 4,035,787 | 7/1977 | Hornung | 73/362 AR X |
| 4,060,715 | 11/1977 | Scott | 73/362 AR X |

Primary Examiner—Charles A. Ruehl
Attorney, Agent, or Firm—Hoffmann, Meyer & Coles

[57] ABSTRACT

A thermistor temperature sensing system includes a conventional comparator having a constant reference threshold voltage and a linearized thermistor sensor which in combination detect a limited range of desirable temperatures. A means is also disclosed for extending the linearization of the thermistor in a piecewise manner at at least one temperature extreme where linearity typically severely deteriorates. In a thermistor temperature sensing system, linearization of thermistor characteristics with respect to at least one temperature within the temperature extreme is achieved by utilizing circuitry which makes the threshold voltage of the conventional comparator a function of the setting of a potentiometer for a desired temperature within the temperature extreme to be sensed by a thermistor sensor. The piecewise linearization technique disclosed allows easy interface with the thermistor temperature sensing system for detection of an optimum of selectable temperatures in the extended range of linearized characteristics of the thermistor.

9 Claims, 4 Drawing Figures

LINEARIZATION MEANS AND METHOD FOR A THERMISTOR TEMPERATURE SENSING SYSTEM

BACKGROUND OF THE INVENTION

1. Field of the Invention

The present invention relates to thermistor temperature sensing systems used to sense or measure a desired temperature or range of temperatures.

Generally speaking, the invention disclosed herein includes a unique thermistor temperature sensing system for detecting a limited range of temperatures and a means for extending previously linearized characteristics of a thermistor with respect to temperature where the thermistor is utilized in such a circuit for sensing a limited range of temperatures and it is desirable to extend the range of temperatures which may be accurately sensed.

3. Description of the Prior Art

It is well known in the art that the characteristics of a thermistor vary with temperature in a non-linear fashion and more particularly that the resistance of a thermistor decreases exponentially as the temperature of the thermistor increases. Accordingly, in order to utilize a thermistor as an accurate temperature sensing and/or measuring element in a temperature sensing system a means for linearizing the exponential characteristics of the thermistor is necessary. A well known technique for linearizing the characteristics of a thermistor over a limited range of temperatures is shown in FIG. 1. Such technique includes electrically coupling a single fixed resistor in series with the thermistor. This combination when coupled to a DC power supply produces a characteristic curve of current versus temperature for the thermistor such as is shown in FIG. 2. It is clear that for a limited range of temperatures L (FIG. 2) the current I passing through a thermistor which has been coupled in series with a resistor (as shown in FIG. 1) is a linear function of the thermistor temperature T. In fact, the point of optimum linearization of the current versus temperature characteristics will occur at a temperature $T_i$ representing the inflection point of the curve shown in FIG. 2.

Typical temperature sensing systems which utilize a thermistor as the sensor recognize that the voltage at a node joining the thermistor with the linearization resistor will be a linear function of temperature in a limited range of temperatures since the current is linearly increasing with temperature within such range of temperatures. Accordingly, the typical temperature sensing system utilizes a conventional comparator to compare the voltage at the node joining the thermistor to the linearization resistor to a voltage established by the setting of a linear potentiometer. When the voltage at the node substantially equals the voltage established by the setting of the potentiometer a signal is produced by the comparator which may be used to indicate that the temperature of the thermistor has reached the desired set point temperature.

However, the conventional temperature sensing system which utilizes a thermistor as the sensing element in the manner described above has the distinct disadvantages of only being accurate over a limited range of temperatures because of the limited ability to linearize the characteristics of the thermistor by the technique shown in FIG. 1, of requiring the use of a more expensive potentiometer, and the reference threshold voltage of the comparator is a function of the setting of the potentiometer. As shown in FIG. 2, at extreme operating temperatures of the thermistor the linear characteristics of the current versus temperature curve severely deteriorate and therefore a temperature being sensed by a sensing system utilizing a thermistor which is within the extreme temperature zones can not be measured accurately. It can therefore be seen that the conventional thermistor sensing system is limited to the measurement of temperatures falling within a very narrow band of temperatures where the band of temperatures is determined by the value of the linearizing resistor coupled in series with the thermistor and the physical parameters of the thermistor utilized as the sensing element.

SUMMARY OF THE INVENTION

In accordance with the present invention in its broadest concept, there is provided a thermistor temperature sensing system for detecting a limited range of temperatures and a means and method for optimizing the linearization of thermistor characteristics whereby the thermistor may be utilized in the temperature sensing system to accurately sense temperatures within an extended range of temperatures.

Accordingly, it is a feature of the present invention to provide a thermistor temperature sensing system for detecting temperatures within a limited range of temperatures utilizing a conventional comparator having a constant reference threshold voltage and an inexpensive potentiometer where the threshold voltage is independent of the potentiometer set point.

It is another feature of the present invention to provide a piecewise linearization means for extending the linearization of the thermistor characteristic of current versus temperature at at least one temperature extreme where linearity typically severely deteriorates.

It is a further feature of the present invention to provide a thermistor temperature sensing system as described above which is capable of accurately measuring temperatures within an extended range of temperatures.

It is yet another feature of the present invention to provide a thermistor temperature sensing system as described above wherein circuitry is provided which makes the threshold voltage of a conventional comparator a function of temperatures set by the potentiometer to be sensed which are within the extended range of temperatures.

It is still another feature of the present invention to provide a piecewise linearization method for extending the linearization of thermistor characteristics at at least one temperature extreme which includes the step of making the threshold voltage of a conventional comparator a function of temperatures set by the potentiometer to be sensed which are within the extended range of temperatures.

Other features and advantages of the present invention will be apparent from the following detailed description of a preferred embodiment thereof, which description should be considered in conjunction with the accompanying drawings in which:

DESCRIPTION OF THE PREFERRED EMBODIMENT

It is well known to those skilled in the art that thermistor resistance varies exponentially with temperature in accordance with the equation:

$$R(T_1) = R(T_2) e^{\beta\left(\frac{1}{T1} - \frac{1}{T2}\right)}$$  Equation (1)

where
$R(T_1)$ = thermistor resistance at temperature $T_1$
$R(T_2)$ = thermistor resistance at temperature $T_2$
e = Naperian base 2.713...
$\beta$ = material constant of the thermistor Accordingly, in order that a thermistor may be utilized as a temperature sensor in a temperature sensing system, some degree of linearization of the aforementioned thermistor characteristic with respect to temperature must be achieved to accurately signal the temperature of the thermistor.

Figure 1:
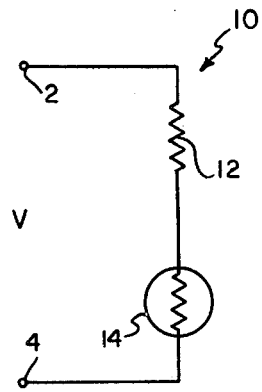
FIG. 1 is a conventional schematic diagram of a means for linearizing the exponential characteristics of a thermistor.
Figure 2:
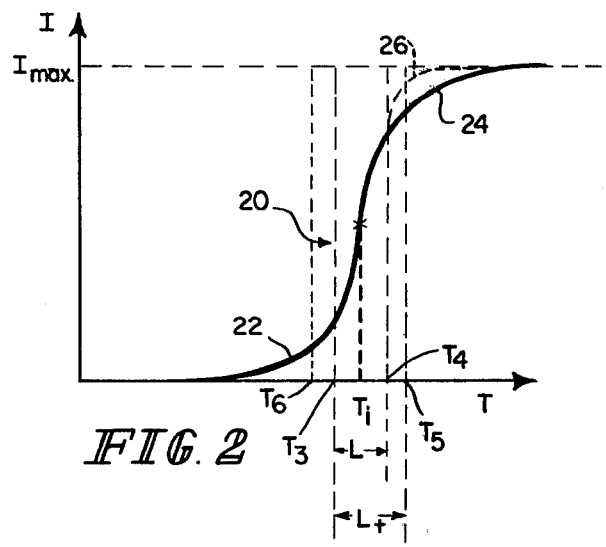
FIG. 2 is a graphic representation of current versus temperature characteristics of a thermistor which has been linearized in accordance with the means shown in FIG. 1.

Referring to FIG. 1 there is shown a conventional means 10 for linearizing the exponential characteristics of a thermistor 14 over a limited range of temperatures. As illustrated, a fixed linearization resistor 12 is electrically coupled in series with the thermistor 14. By electrically coupling this series combination of resistor 12 and thermistor 14 to a DC power supply having a voltage V by means of leads 2 and 4 a characteristic curve 20 of thermistor current I versus thermistor temperature T as shown in FIG. 2 is achieved for a preselected resistance value R (12) of resistor 12. As indicated by curve 20, for a limited range L of temperatures T between temperatures $T_3$ and $T_4$ the thermistor current I increases substantially linearly with respect to increases in thermistor temperature T. Continuing to refer to FIG. 2, one would expect that the point on curve 20 where an increase in thermistor current I would most accurately reflect a corresponding increase in thermistor temperature T would be at the inflection point of the curve 20 or as illustrated, at thermistor temperature $T_i$. As further shown by FIG. 2, in the regions 22 and 24 of curve 20, where the temperature T of the thermistor 14 reaches extreme values, the linearization of current I versus temperature T severely deteriorates making the accurate measurement or detection of temperatures in these regions 22 and 24 very difficult utilizing the conventional thermistor linearization means 10 shown in FIG. 1. Accordingly, the utilization of the conventional thermistor linearization means 10 in a temperature sensing system limits the range L of temperatures T which can be accurately measured or detected by the temperature sensing system.

Figure 3:
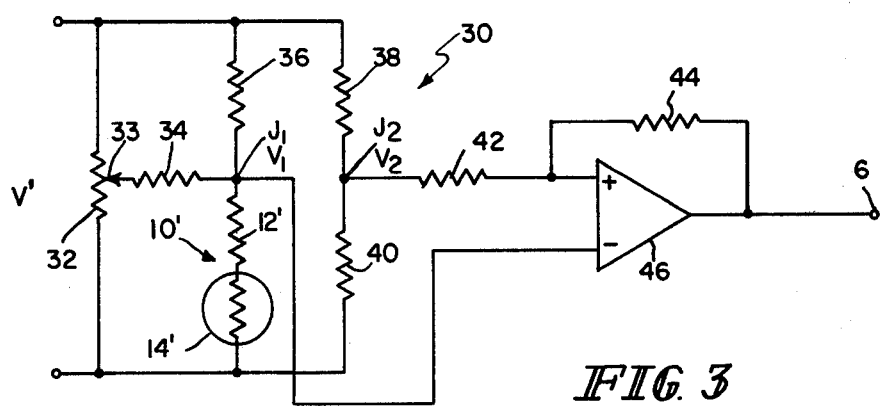
FIG. 3 is a schematic diagram of a system for measuring a desired temperature sensed by a thermistor sensor utilizing the conventional thermistor linearization circuit shown in FIG. 1.

Referring now to FIG. 3 there is shown a temperature sensing system 30 which includes as a temperature sensor a thermistor 14' and a linearization resistor 12' comprising a thermistor linearization means 10' equivalent to the one shown in FIG. 1 for accurately measuring or detecting a range L of temperatures T between temperatures $T_3$ and $T_4$ as graphically depicted in FIG. 2. In addition to thermistor linearization means 10', system 30 further includes a linear potentiometer 32 electrically coupled across the DC voltage V' having a wiper 33; a resistor 36 electrically coupled to thermistor linearization means 10' at node J1 which assists in establishing a constant current through thermistor 14'; a resistor 34 having one side electrically coupled to node J1 and another side electrically coupled to the wiper 33 of potentiometer 32; resistors 38 and 40 electrically coupled in series at node J2 across DC voltage V' forming a voltage divider network; and a conventional voltage comparator circuit 46 such as the LM139 series of comparator integrated circuits manufactured by National Semiconductor having a negative input denoted by a minus - sign electrically coupled to node J1 and a positive input denoted by a plus + sign electrically coupled through a resistor 42 to node J2, an output 6, and a constant reference threshold voltage V2 appearing at node J2 which is determined by resistors 38 through 44. Resistor 34 should have a resistance value R(34) which is substantially greater than the resistance value R(32) of the potentiometer 32 to minimize loading of the potentiometer 32. The current through resistor 34 will vary linearly with the setting of the linear potentiometer 32. Accordingly, by adjusting the wiper 33 of potentiometer 32, a desired set point temperature $T_{sp}$ may be selected to be detected or measured by the system 30; however, because of the limited range L of temperatures which can be accurately sensed by the linearized thermistor 14' the accuracy of system 30 is limited to those temperatures between $T_3$ and $T_4$ as shown on curve 20 in FIG. 2.

Since between temperatures $T_3$ and $T_4$ the current I of thermistor 14' varies substantially linearly with the temperature T of thermistor 14', the thermistor current I at node J1 will also be a linear function of the temperature T of thermistor 14' at least for temperatures between $T_3$ and $T_4$ (shown in FIG. 2). Comparator 46 is therefore utilized to compare its constant reference threshold voltage V2 to the voltage V1 which will appear at node J1 when the temperature T or current I of thermistor 14' substantially equals the desired set point temperature $T_{sp}$ selected by adjusting the potentiometer 32 which determines the current through resistor 34. In fact, system 30 shown in FIG. 3 detects the change in current I through the thermistor 14' as it varies linearly with the temperature T of the thermistor 14' in accordance with the curve 20 shown in FIG. 2. Accordingly, when the sum of the currents through resistors 34 and 36 equals the current I through thermistor 14' and linearization resistor 12' which will occur at V1 equal to V2 then the temperature T of the thermistor 14' will be measured or detected by the system 30 resulting in an output 6 which indicates that the thermistor temperature T equals or exceeds the set point temperature $T_{sp}$.

Utilizing the unique thermistor temperature sensing system 30 shown in FIG. 3 which has the capability of accurately measuring or detecting temperatures over a limited range L of temperatures between temperatures $T_3$ to $T_4$ in accordance with the linearized thermistor curve 20 shown in FIG. 2, it is desirable to extend the range L of temperatures which may be accurately detected by system 30 to a range L+ between either temperatures $T_3$ to $T_5$ or temperatures $T_6$ to $T_4$ and optimize the number of temperatures for which the system 30 will most accurately detect temperatures. The present invention therefore further provides a piecewise linearization means and method for extending the range of temperatures which may be accurately measured by the thermistor temperature sensing system 30 at either lower extreme temperatures $T_6$ to $T_4$ or higher extreme temperatures $T_3$ to $T_5$. For purposes of this disclosure the piecewise linearization means and method will be described with respect to extending the range of temperatures at the higher extreme temperatures $T_3$ to $T_5$; however, it will be recognized by those skilled in the art that the piecewise linearization means and method described may also be used to extend the range of temperatures at the lower extreme temperatures $T_6$ to $T_4$ shown in FIG. 2.

As an example, it was desirable that system 30 of FIG. 3 accurately detect temperatures in the range of 90° to 200° Fahrenheit (F.) utilizing a thermistor 14' having a specific resistance value $R_0$ at a specified temperature $T_0$ within the desired range of 90° to 220° F. and a material constant $\beta$ unrelated to either $R_0$ or $T_0$. Referring to FIG. 3 the thermistor temperature sensing system 30 was analyzed and resistance values selected for various resistors included within the system 30.

Recognizing that the reference threshold voltage V2 of comparator 46 at node J2 is ratiometrically related to the DC voltage V', at least two fractional constants $K_0$ and $K_1$ were defined to represent the fraction of voltage V' of the potentiometer wiper 33 voltage with respect to ground potential and the fraction of voltage V' across resistor 40 respectively. Accordingly, for any desired set point temperature $T_{sp}$ within the desired range of 90° to 200° F. the value of $K_0$ would be determined by the equation:

$$K_o = \frac{T_{sp} - 90}{200 - 90}$$

Also, from an inspection of the currents appearing at node J1 when the temperature T of thermistor 14' equals the desired set point temperature $T_{sp}$ (V1=V2), the following equation was derived for system 30:

$$\frac{K_1}{R(12') + R_o e^{\beta\left(\frac{1}{T} - \frac{1}{T_o}\right)}} = \frac{1-K_1}{R(36)} + \frac{K_o-K_1}{R(34)} \quad \text{Equation (2)}$$

where
$K_0$ and $K_1$ are the fractional constants discussed above
$R(12')$ = resistance value of linearization resistor 12'
$R(34)$ = resistance value of resistor 34
$R(36)$ = resistance value of resistor 36

$$R_o e^{\beta\left(\frac{1}{T} - \frac{1}{T_o}\right)} = R(T)$$

the resistance value of thermistor 14' at a temperature T.(in degrees Kelvin). Furthermore, the resistance value $R(12')$ of linearization resistor 12' determines the location of curve 20 with respect to temperature T and $R(12')$ is determined by the equation:

Equation (3)

$$R(12') = R(T_i)\left(\frac{\beta - 2T_i}{\beta + 2T_i}\right)$$

where $R(T_i)$ = resistance value of thermistor 14' at the inflection point temperature $T_i$. Accordingly, it was necessary to select a value for temperature $T_i$ in order to locate curve 20 within the desired temperature range of 90° to 200° F. Knowing the resitance value $R_0$ of thermistor 14' at temperature $T_0$ inside the temperature range L, the inflection point temperature $T_i$ was chosen to equal $T_0$ and therefore the resistance value $R(T_i)$ of the thermistor 14' at temperature $T_i$ equaled $R_0$. As shown in FIG. 2, the temperature $T_i$ at the point of inflection of curve 20 is substantially midway between the linearized range L of temperatures $T_3$ to $T_4$; accordingly, the value of $K_1$ was chosen to equal the value of $K_0$ at a set point temperature $T_{sp}$ equal to temperature $T_0$ ($T_i$). Utilizing equation (2) above, the calculation of resistance values $R(36)$ and $R(34)$ for resistors 36 and 34 respectively was simplified. The equation for $R(36)$ becomes:

Equation (4)

$$R(36) = (R(12') + R(T_i))\left(\frac{1-K_1}{K_1}\right)$$

where
$R(T_i) = R(T_0) = R_0$ and the equation for $R(34)$ becomes:

$$R(34) = \frac{K_o - K_1}{\frac{K_1}{R(12') + R(T_{sp})} - \frac{1-K_1}{R(36)}} \quad \text{Equation (5)}$$

where
$R(T_{sp})$ = resistance value of thermistor 14' when its temperature T equals the set point temperature $T_{sp}$. From equation (5) it can be seen that the resistance value $R(34)$ will depend upon which end of the desired temperature range of 90° to 200° F. accuracy is to be assured. If accuracy is to be assured at $T_{sp}$ = 90° F. then $T_3$ (FIG. 2) should equal 90° F. and $K_0$ will equal zero (0) at $T_{sp}$ = 90° F. If accuracy is to be assured at $T_{sp}$ = 200° F. then $T_4$ (FIG. 2) should equal 200° F. and $K_0$ will substantially equal one (DC voltage V') at $T_{sp}$ = 200° F. For this example, it was desirable to assure the accuracy of system 30 at $T_{sp}$ = 90° F. Utilizing the equations above to calculate the resistance values $R(34)$, $R(12')$ and $R(36)$ it was determined that by selecting $T_3$ = 90° (see FIG. 2) the range L of temperatures which system 30 could accurately measure was between $T_3$ = 90° F. and $T_4$ = 180° F. Accordingly, temperatures in the range between $T_4$ = 180° F. and $T_5$ = 200° F. could not be accurately measured or detected by the system 30 (FIG. 3).

Since $K_1$ was chosen to equal $K_0$ at $T_{sp}$ equal to $T_0(T_i)$ it was desirable to determine whether $K_1$ (or V2) would in fact remain constant over the range of desired temperatures 90° to 200° F. The following equation for $K_1$ was therefore derived from equation (2) above:

Equation (6)

$$K_1 = \frac{(R(12') + R(T))(R(34) + K_o(T)R(36))}{R(36)R(34) + (R(34) + R(36))(R(12') + R(T))}$$

where

R(T) = equation (1)

$K_0(T)$ = the value of $K_0$ at temperature T of thermistor 14'. From equation (6) it can be seen that the value of $K_1$ depends upon the exact values of resistors 34, 36, and 12'. Since most resistors which may be practically used in system 30 have a tolerance band of resistance values, the exact value of $K_1$ will vary within the tolerances of the specific resistors 34, 36, and 12' used. In order to compensate for this uncertainty and to assure a substantially constant value for $K_1$ a calibration potentiometer 52 was electrically coupled in series with resistors 38 and 40 as shown in FIG. 4.

After analyzing the system 30 in the manner described above, it appeared that some means and/or method was necessary to extend the linearization of thermistor 14' from range L of temperatures between $T_3 = 90°$ F. to $T_4 = 180°$ F. to a desired range L+ of temperatures between $T_3 = 90°$ F. to $T_5 = 200°$ F. in order that the system 30 could accurately measure or detect any desired temperatures between 90° to 200° F. In accordance with the present invention, a piecewise method for accomplishing this extension of linearization at at least one temperature extreme includes the utilization of equation (6) and making $K_1$ a function of the set point potentiometer 32 at least over the range of temperatures between $T_4 = 180°$ F. and $T_5 = 200°$ F. There is no problem in the temperature range L of 90° to 180° F., since as previously shown, because of the linearity of current I versus temperature T of thermistor 14' the set point temperature $T_{sp}$ or current through resistor 36 and resistor 34 substantially equals the temperature T or current I of the thermistor 14' and therefore at least in range L of temperatures $T_3$ to $T_4$ the constant $K_1$ is substantially a constant fraction. However, beyond $T_4 = 180°$ F. the set point temperature $T_{sp}$ does not accurately reflect the temperature T of the thermistor. Therefore a means must be employed for temperatures above $T_4$ to maintain a close relationship between $K_1$ and $T_{sp}$.

Figure 4:
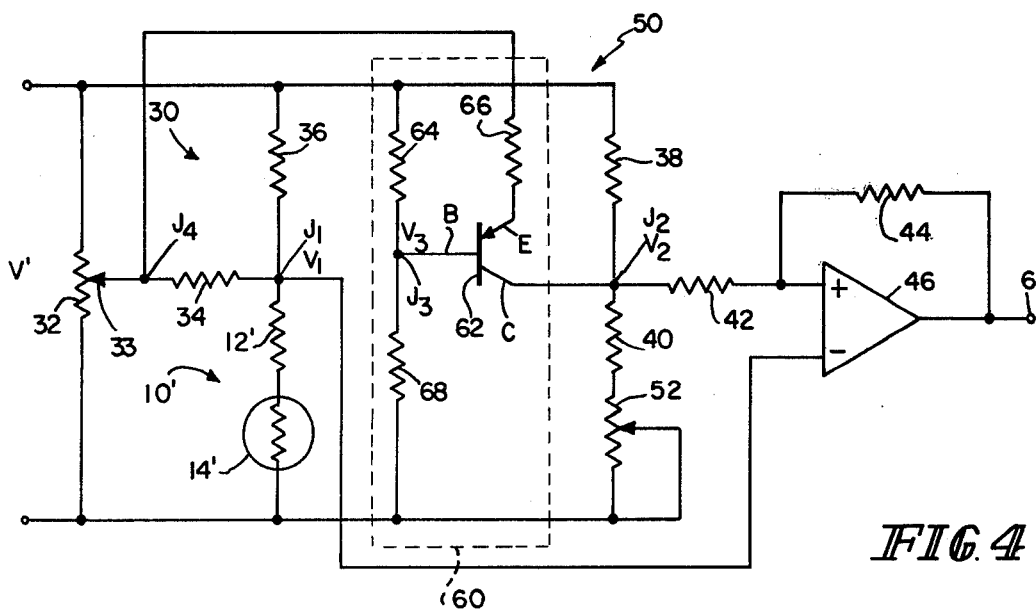
FIG. 4 is a schematic diagram of a system for measuring a desired temperature sensed by a thermistor including means for extending the linearization of thermistor characteristics.

Referring now to FIG. 4 there is shown an improved thermistor temperature sensing system 50 capable of accurately measuring or detecting an extended range L+ of temperatures $T_3$ to $T_5$ (FIG. 2) which includes the thermistor temperature sensing system 30 shown in FIG. 3, a calibration potentiometer 52 electrically coupled to system 30 as described above, and a piecewise linearization means 60 electrically coupled to system 30 for extending the linearity of curve 20 (FIG. 2) for thermistor 14' from temperature $T_4 = 180°$ F. to $T_5 = 200°$ F. as shown by the linearized upper extreme temperature region 26 of curve 20. In the improved system 50 the sensing system 30 operates as previously described hereinabove having the same components and component values evidenced by the same reference numerals as used in FIG. 3; therefore, the operation of system 30 itself will not again be described here.

Piecewise linearization means 60 includes a bipolar semiconductor switching device 62 which as illustrated in FIG. 4 is a PNP transistor having its collector C electrically coupled to node J2 of sensing system 30, its emitter E electrically coupled to a note J4 between wiper 33 of potentiometer 32 and resistor 34 each a part of sensing system 30 through a resistor 66 and its base B electrically coupled to a voltage divider network comprising resistors 64 and 68 at a node J3 electrically coupling resistors 64 and 68. Coupled as described above bipolar semiconductor switching device 62 is biased by selecting values of resistors 64 and 68 to assure an appropriate voltage V3 at node J3 so that switching device 62 does not begin to conduct or is only turned on when the potentiometer 32 has been set at a set point temperature $T_{sp}$ which is greater than $T_4 = 180°$ F. When switching device 62 turns on, a correction current flows from potentiometer 32 through resistor 66 and switching device 62 to node J2 to provide a correction to the constant $K_1$ in the temperature range of 180° F. to 200° F. Accordingly, the threshold voltage V2 appearing at node J2 in the temperature range of $T_4 = 180°$ F. to $T_5 = 200°$ F. is adjusted in a piecewise manner for each individual setting of potentiometer 32 by piecewise linearization means 60 depending upon the set point temperature $T_{sp}$ which is greater than $T_4 = 180°$ F. and therefore $K_1$ becomes a function of $T_{sp}$ in the temperature range $T_4 = 180°$ F. to $T_5 = 200°$ F. thereby compensating for the deterioration of linearity for a temperature T within the temperature extreme 24 of curve 20.

In view of the above description it will be seen that the several objects of the invention are achieved and other advantageous results attained and that further modifications can be made without departing from the spirit and scope of the invention as defined in the appended claims.

What I claim is:

1. In a temperature sensing system which includes a thermistor sensor, means for substantially linearizing at least one characteristic of said thermistor sensor over a limited range of temperatures, and means for accurately detecting at least one temperature selected from said limited range of temperatures, the improvement which comprises: a piecewise linearization means for extending said limited range of temperatures for which said characteristic is substantially linearized to at least one temperature extreme for said thermistor sensor wherein said piecewise linearization means is biased to activate only when a temperature within said temperature extreme is selected to be sensed.

2. The improved temperature sensing system as recited in claim 1 wherein said characteristic of said thermistor sensor is temporarily linearized for each temperature selected from a plurality of temperatures within said temperature extreme by said piecewise linearization means whereby said limited range of temperatures is temporarily extended to said selected temperature within said temperature extreme and said selected temperature within said temperature extreme is accurately detected.

3. The improved temperature sensing system as recited in claim 2 wherein said limited range of temperatures for which said thermistor characteristic is substantially linearized is extended to at least one temperature in a high temperature extreme for said thermistor sensor by said piecewise linearization means.

4. The improved temperature sensing system as recited in claim 2 wherein said limited range of temperatures for which said thermistor characteristic is substantially linearized is extended to at least one temperature in a low temperature extreme for said thermistor sensor by said piecewise linearization means.

5. The improved temperature sensing system as recited in claim 1 wherein said piecewise linearization means includes a bipolar semiconductor switching device responsive to said means for substantially linearizing said characteristic of said thermistor over said limited range of temperatures for supplying an electrical signal to provide a temporary adjustment to an otherwise constant reference thereby assuring that said selected temperature within said temperature extreme is accurately detected by said temperature sensing system.

6. The improved temperature sensing system as recited in claim 5 wherein said bipolar semiconductor switching device is a PNP transistor having its emitter electrically coupled to said means for substantially linearizing said characteristic of said thermistor, its collector electrically coupled to said means for accurately detecting said temperature selected from said limited range of temperatures and its base electrically coupled to a voltage divider network whereby said transistor is activated when said temperature to be sensed is selected from said temperature extreme.

7. In a method of accurately detecting at least one temperature utilizing a thermistor sensor which includes the steps of substantially linearizing at least one characteristic of said thermistor sensor over a limited range of temperatures including said temperature to be detected and comparing said linearized characteristic of said thermistor sensor at said temperature with a predetermined reference to detect said temperature, the improvement which comprises the step of: extending said limited range of temperatures for which said characteristic of said thermistor sensor is substantially linearized to at least another temperature within at least one temperature extreme of said thermistor sensor by temporarily redefining said predetermined reference for each other temperature selected to be detected from a plurality of temperatures within said temperature extreme whereby said other temperature outside said limited range of temperatures is accurately detected.

8. A temperature sensing system comprising: at least one thermistor sensor, means for substantially linearizing at least one characteristic of said thermistor sensor over a limited range of thermistor temperatures, means for selecting at least one desired temperature to be sensed from a plurality of temperatures within said limited range of thermistor temperatures, and means for accurately detecting said desired selected temperature by comparing a substantially constant reference voltage to at least one other voltage having a single predetermined value for substantially all of said plurality of temperatures within said limited range of thermistor temperatures at which said thermistor temperature equals said desired selected temperature, said constant reference voltage and said other voltage having values which are independent of said desired selected temperature.

9. The temperature sensing system as recited in claim 8 wherein said single predetermined value of said other voltage at which said thermistor temperature equals said desired selected temperature is equal to said constant reference voltage and said desired selected temperature is detected when by comparing said substantially constant voltage to said other voltage their values are found to be equal.

* * * * *